(12) United States Patent
Lee et al.

(10) Patent No.: US 7,808,143 B2
(45) Date of Patent: Oct. 5, 2010

(54) PERMANENT MAGNET MOTOR

(75) Inventors: Simon Lee, Taoyuan Hsien (TW);
Wen-Ho Yu, Taoyuan Hsien (TW)

(73) Assignee: Rechi Precision Co., Ltd., Taoyuan Hsien (TW)

( * ) Notice: Subject to any disclaimer, the term of this patent is extended or adjusted under 35 U.S.C. 154(b) by 0 days.

(21) Appl. No.: 11/976,448

(22) Filed: Oct. 24, 2007

(65) Prior Publication Data
US 2010/0213780 A1    Aug. 26, 2010

(51) Int. Cl.
*H02K 21/12*    (2006.01)
(52) U.S. Cl. ............................ 310/156.53; 310/156.45; 310/156.56
(58) Field of Classification Search ................................
310/156.38–156.57, 216.111, 216.93
See application file for complete search history.

(56) References Cited
U.S. PATENT DOCUMENTS

| | | | |
|---|---|---|---|
| 5,861,693 A * | 1/1999 | Takahashi ................... 310/113 |
| 6,147,428 A * | 11/2000 | Takezawa et al. ...... 310/156.57 |
| 6,342,745 B1 * | 1/2002 | Sakai et al. ............. 310/156.56 |
| 6,525,442 B2 * | 2/2003 | Sakai et al. ............. 310/156.48 |
| 6,917,133 B2 * | 7/2005 | Koharagi et al. ........ 310/156.57 |
| 6,919,662 B2 * | 7/2005 | Tagome et al. .......... 310/156.53 |
| 6,967,424 B2 * | 11/2005 | Popov .................. 310/216.023 |
| 6,987,343 B2 * | 1/2006 | Tagome et al. ......... 310/156.57 |
| 7,151,335 B2 * | 12/2006 | Tajima et al. .......... 310/156.48 |
| 7,230,359 B2 * | 6/2007 | Iles-Klumpner ....... 310/156.53 |

* cited by examiner

*Primary Examiner*—Thanh Lam
(74) *Attorney, Agent, or Firm*—Jackson IPG PLLC; Demian K. Jackson

(57) ABSTRACT

A permanent magnet motor includes stator, rotor, and shaft; multiple rotor magnetic poles are disposed on the rotor; each rotor magnetic pole contains an arc surface and a first inclined section and a second inclined section extending respectively from both sides of the arc surface; a trap is formed between two second inclined section of two abutted rotor magnetic poles connected by a tangent section; multiple magnets are respectively disposed in each rotor magnetic pole; both ends of each magnet being disposed at where close to two second inclined sections; and a central portion of each magnet is indented inwardly towards a center of the rotor to effectively upgrade performance efficiency of the motor.

14 Claims, 9 Drawing Sheets

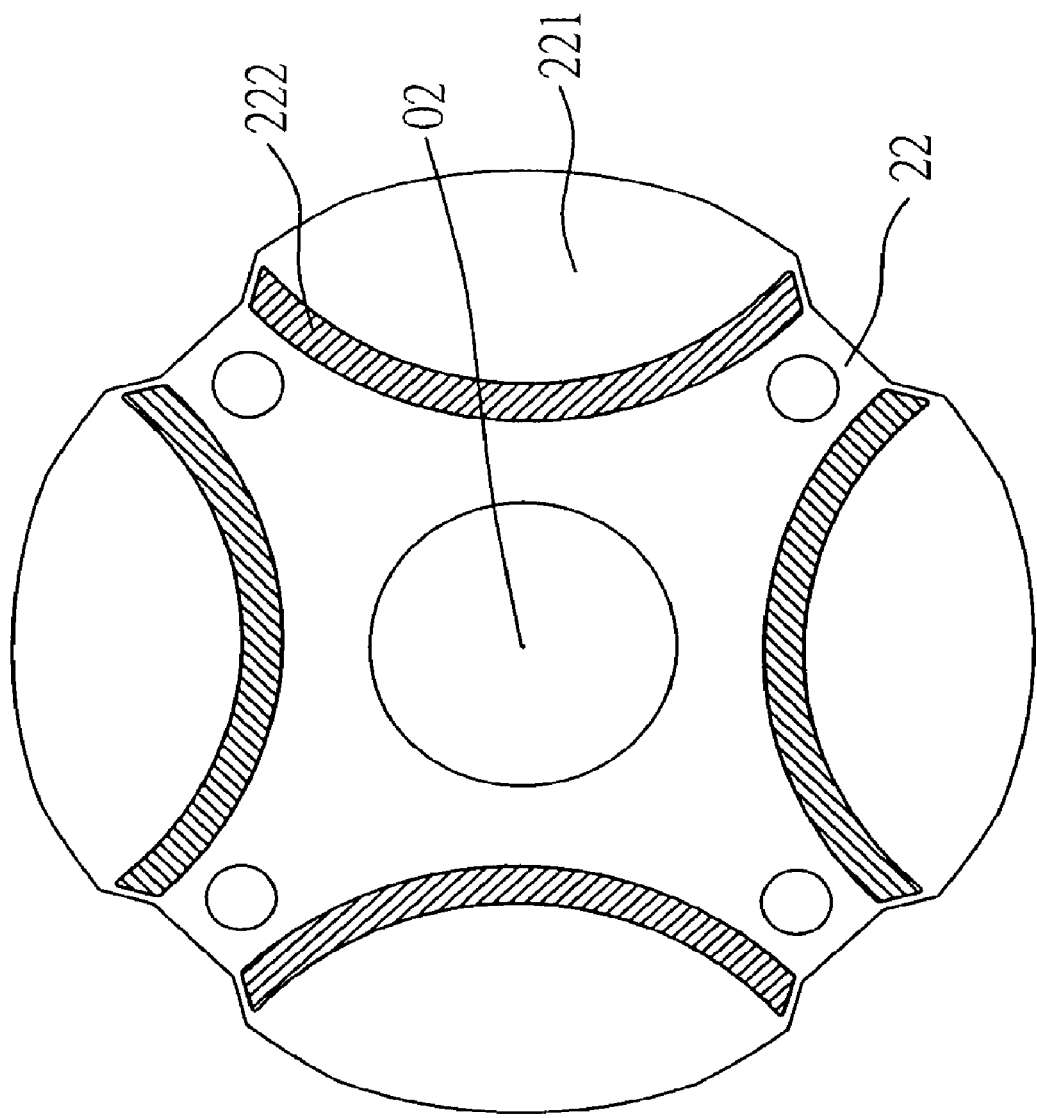

PERMANENT MAGNET MOTOR

BACKGROUND OF THE INVENTION (a) Field of the Invention

The present invention is related to a permanent magnet motor, and more particularly, to one that lowers high harmonic composition contained in start power wave form by reducing change of flux vector so to sufficiently upgrade its performance efficiency.

(b) Description of the Prior Art

Motor is a popular source of motive force in the manufacturing industry today where supply of motive force is needed to drive machines to execute rotation or other forms of motion. Whereas the motor is capable of converting electric power or magnetic power into mechanical power, it has become a must and is comprehensively applied in various types of industrial, electric appliance, and transportation system installations.

Motors are generally available in DC, AC, brush, and brushless. A motor is essentially comprised of a rotor and a stator. Distribution of magnetic flux promotes the rotor to engaging in rotary motion, which is then transferred into mechanical energy as needed. Wherein, a permanent magnet motor takes advantage of magnetism inherited in a magnet to provide magnetic flux. Value of the permanent magnet motor is highly appreciated in the market due to that it produces greater torque, efficacy and precision within a limited volume.

Referring to FIG. 1 for a schematic view showing a construction of a permanent magnet motor 10 of the prior art, the permanent magnet motor 10 includes a rotor 11 and a stator 12. The rotor 11 is disposed with multiple magnets 111 and the stator 12 indicates a ring structure. Multiple stator magnetic poles 121 are disposed an inner circumference of the stator 12, and each stator magnetic pole 121 may be wrapped up with a coil. An air gap is merely created between the rotor 11 and the stator 12 when the rotor 11 and the stator are inserted to each other. As the coils are conducted through, those stator magnetic poles 121 each made of permeable material interact among one another by means of a magnet 111 of the rotor 11 to produce an orbiting. A spindle 13 may be separately provided to the rotor 11 so to transfer mechanical energy for further use when the rotor 11 is engaging in orbiting.

As illustrated in FIG. 1, the rotor 11 of a four-pole motor is disposed with four rotor magnetic poles 112 with each provided with an arc surface 113. A distance between the arc surface 113 and a center 01 of the rotor 11 is gradually reducing from a central point 113a to both sides 113b, 113c; and a trough 114 is provided between two abutted arc surfaces while the gap between the trough 114 and the stator magnetic pole 121 is enlarged. Accordingly, flux of the stator magnetic pole 121a at where in relation to vicinity of the central point 113a of the arc surface 113 will be collected (Flux A) so that magnetism can be easily saturated. Meanwhile, another flux (Flux B) passing through the stator magnetic poles 121b and 121c will be reduced to lower a start power induced at where the stator coil is located. Given with the situation, number of windings of the stator coil must be increased so to provide higher start power induced at where the stator coil is located; however, the stator coil will cause more copper loss to fail effectively upgrade performance efficiency of the motor.

SUMMARY OF THE INVENTION

The primary purpose of the present invention is to provide a permanent magnet motor that lowers high harmonic composition contained in start power wave form by reducing change of flux vector so to sufficiently upgrade the performance efficiency of the motor.

To achieve the purpose, a permanent magnetic motor of the present invention is comprised of stator, is rotor, and shaft; the rotor is provided with multiple rotor magnetic poles; each rotor magnetic pole is disposed with an arc surface, a first inclined section, and a second inclined section with both inclined sections respectively extending from both sides of the arc surface; a trap is defined between second inclined sections of two abutted rotor magnetic poles by a tangent section; multiple magnets are respectively disposed in each rotor magnetic pole; both ends of each magnet are placed at where closer to two second inclined sections; and a central portion of each magnet is recessed towards a center of the rotor.

An included angle $\theta$ defined by the arc surface and when p, the quantity of the rotor magnetic poles are provided in even numbers to satisfy conditions of $(120/p)° \leq \theta \leq (200/P)°$

BRIEF DESCRIPTION OF THE DRAWINGS

FIGS. 5(A)~5(E) are schematic views showing constructions of different forms of magnets in the present invention.

DETAILED DESCRIPTION OF THE PREFERRED EMBODIMENTS

Figure 1:
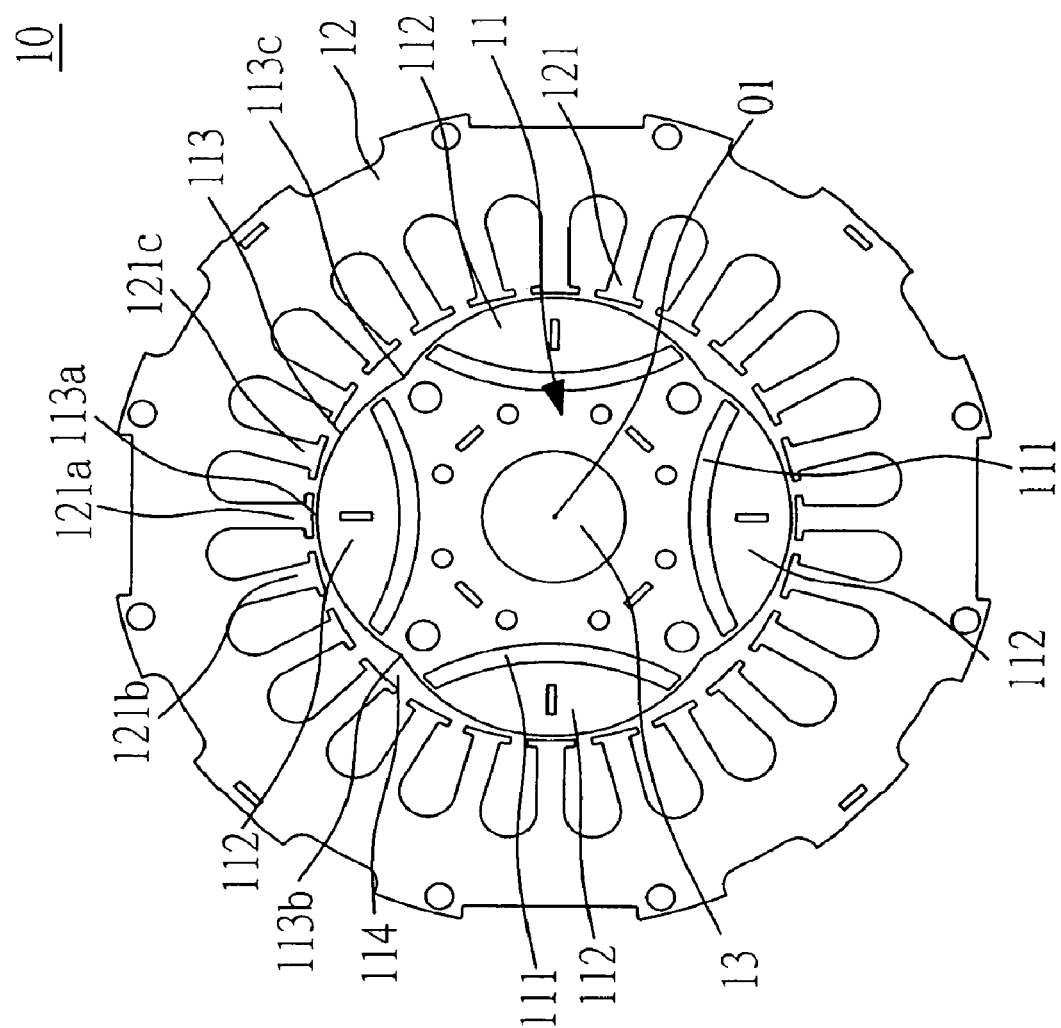
FIG. 1 is a schematic view showing a construction of rotor and stator in a permanent magnet motor of the prior art.
Figure 2:
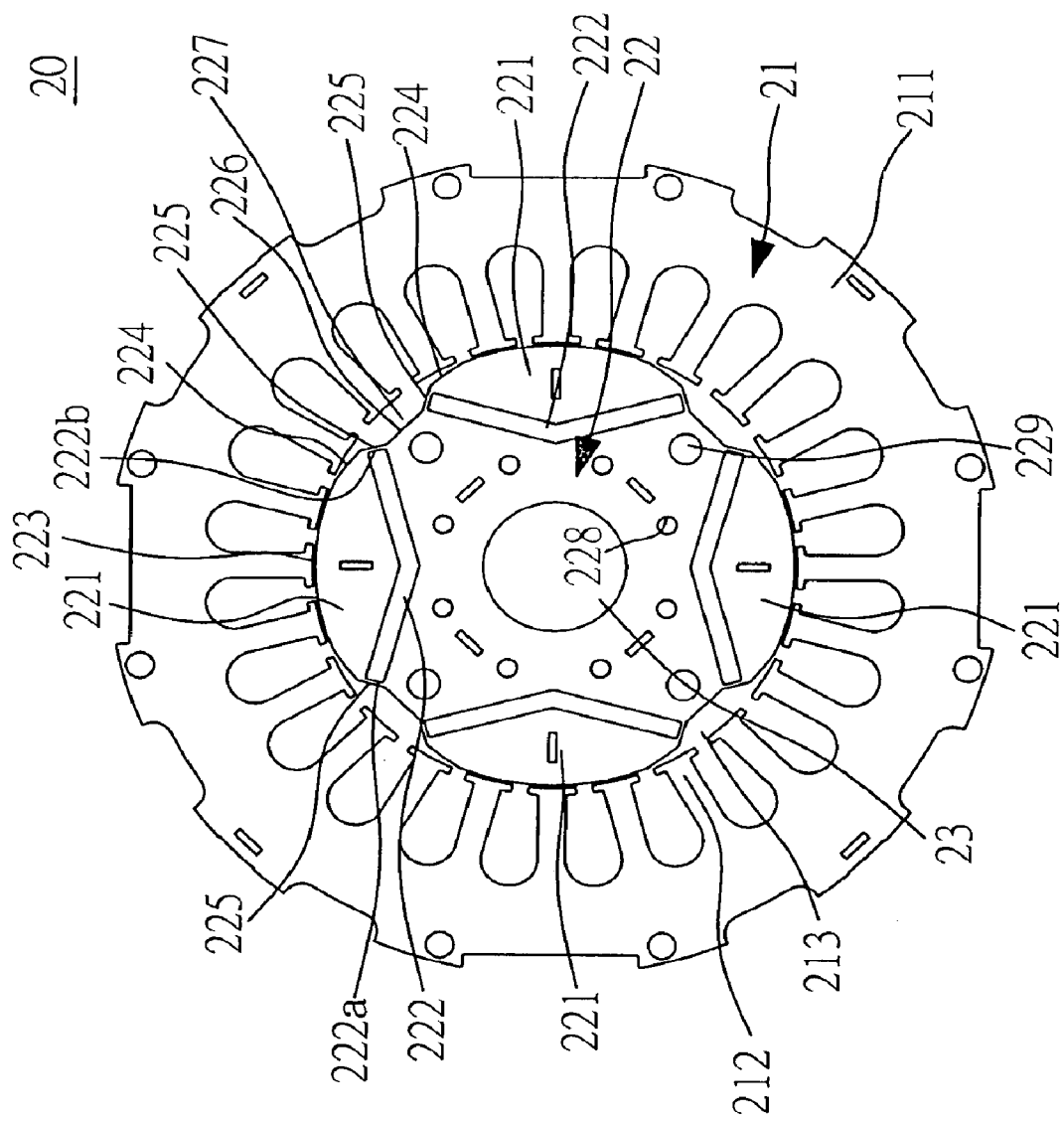
FIG. 2 is a schematic view showing a construction of rotor and stator in a permanent magnet motor of the present invention.
Figure 3:
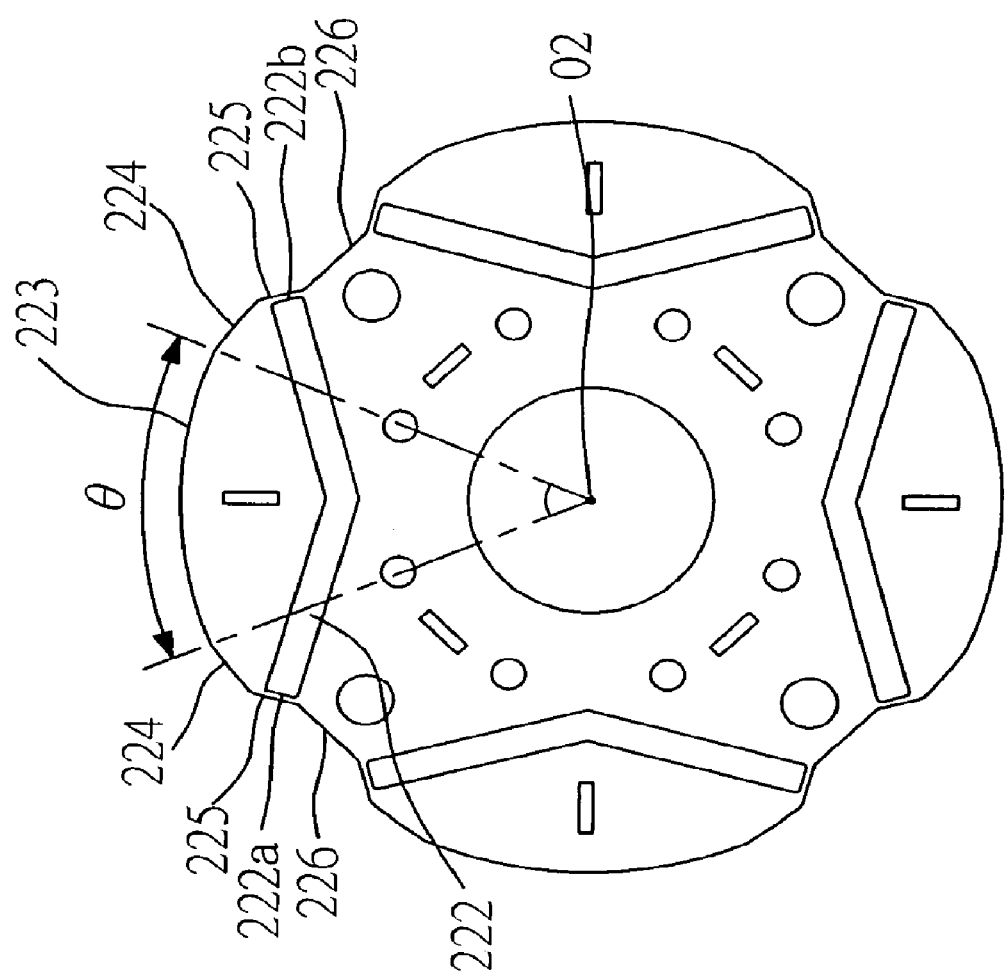
FIG. 3 is a schematic view showing a construction of the rotor in the present invention.
Figure 4:
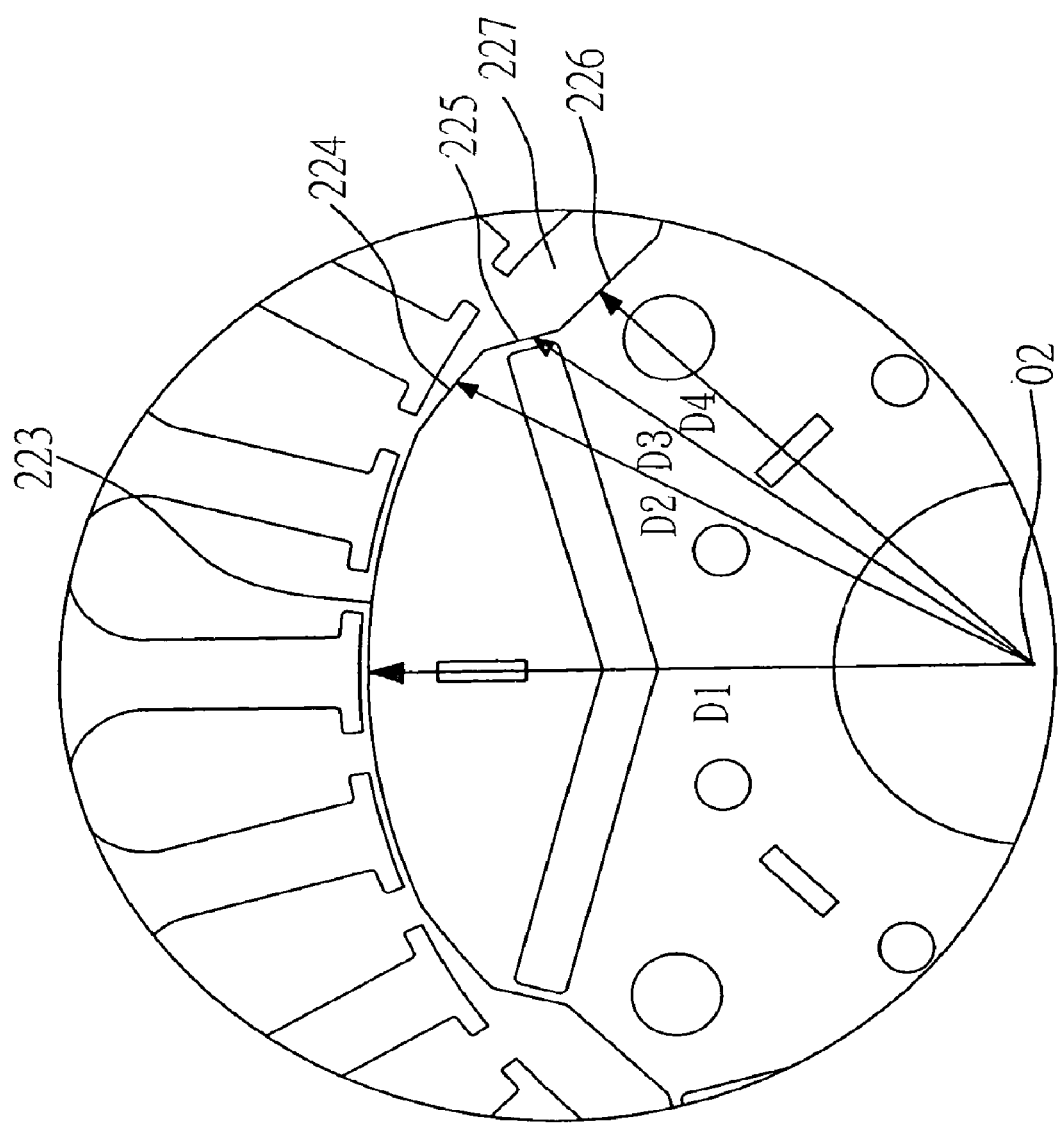
FIG. 4 is a schematic view showing a magnified construction of local parts of the rotor and the stator in the present invention.

The present invention is essentially related to an improved construction of a rotor in an ordinary permanent magnet motor. Referring to FIGS. 2, 3, and 4, a permanent magnet motor 20 is comprised of a stator 21, a rotor 22, and a shaft 23. Wherein the stator 21 includes a ring body 211 and multiple stator magnetic poles 212; each stator magnetic pole 212 protrudes from interior of the ring body 211; and an accommodation room 213 is formed in each stator magnetic pole 212.

The rotor 22 related to a plate approximately indicating a circular form is provided in the accommodation room 213 and keeps an air gap from each stator magnetic pole 212. The rotor 22 is disposed with multiple rotor magnetic poles 221 provided in even numbers with each pole 221 disposed with a magnet 222. In the preferred embodiment, a 4-pole motor is provided; therefore, there are four rotor magnetic poles 221. Each rotor magnetic pole 221 is disposed with an arc surface 223, and a first inclined section 224 and a second inclined section 225 respectively extending in sequence from the arc surface 223; and a trap 227 is defined between two abutted second inclined sections 225 connected by a tangent section 226.

Figure 5B:
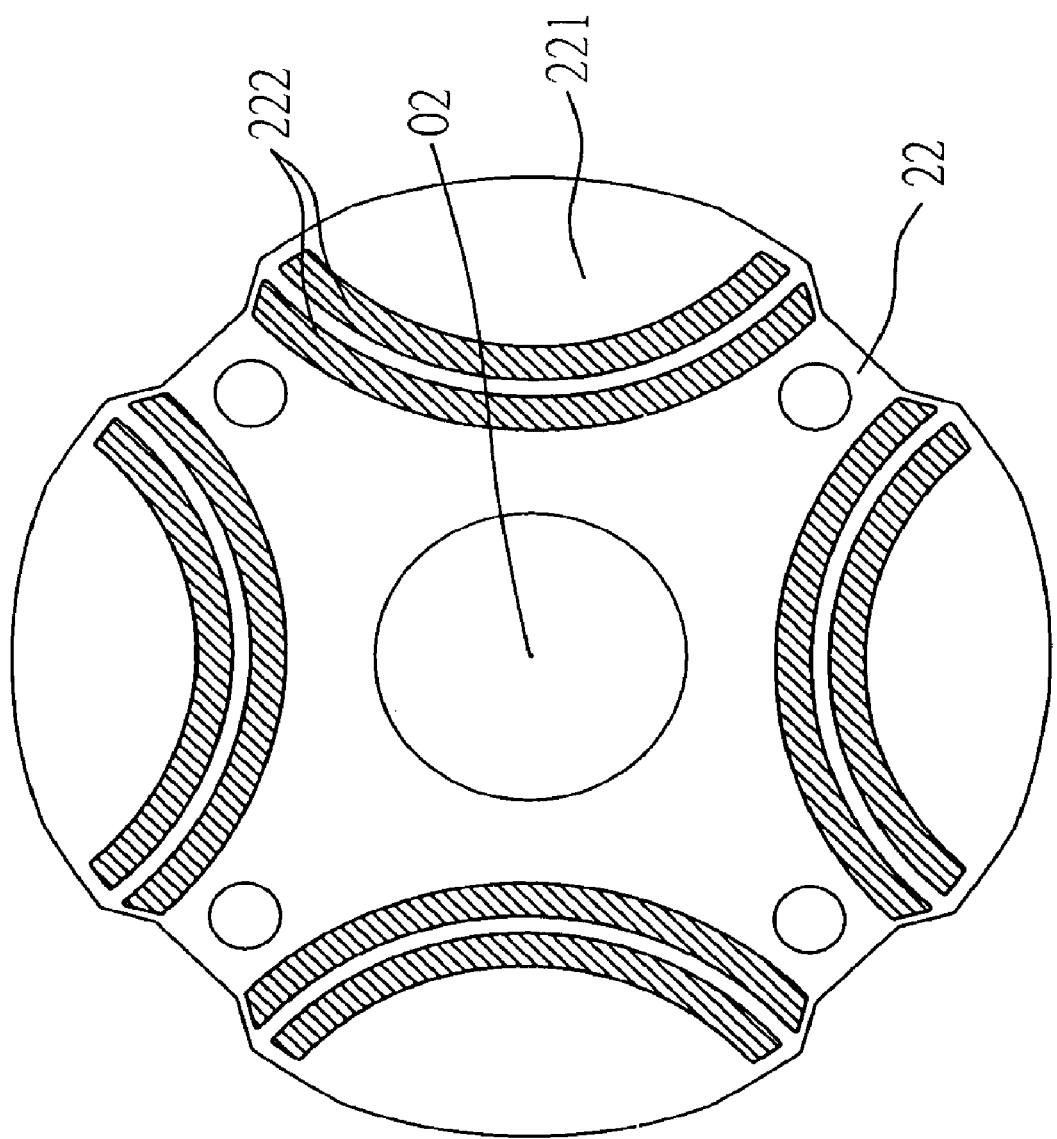
Figure 5C:
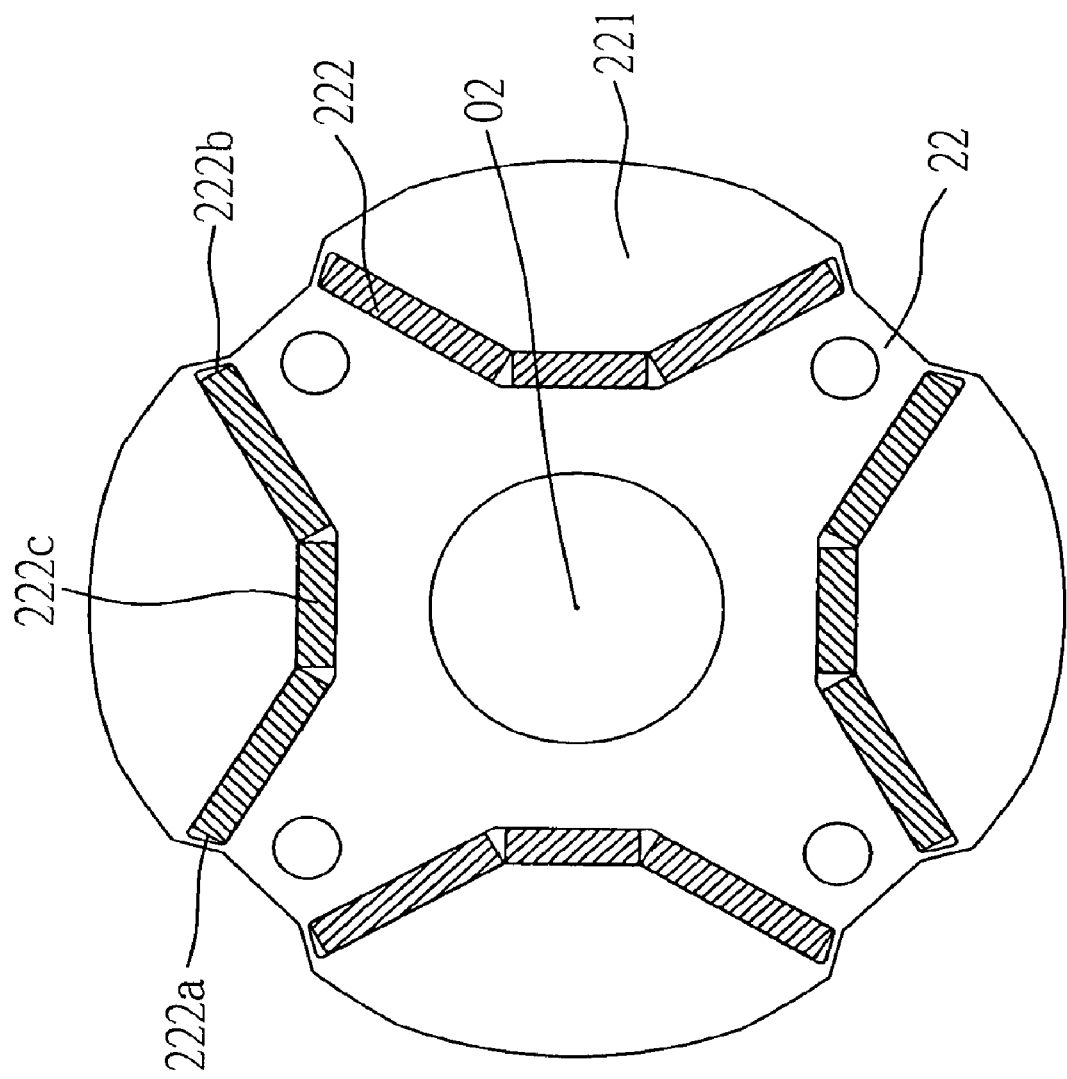
Figure 5D:
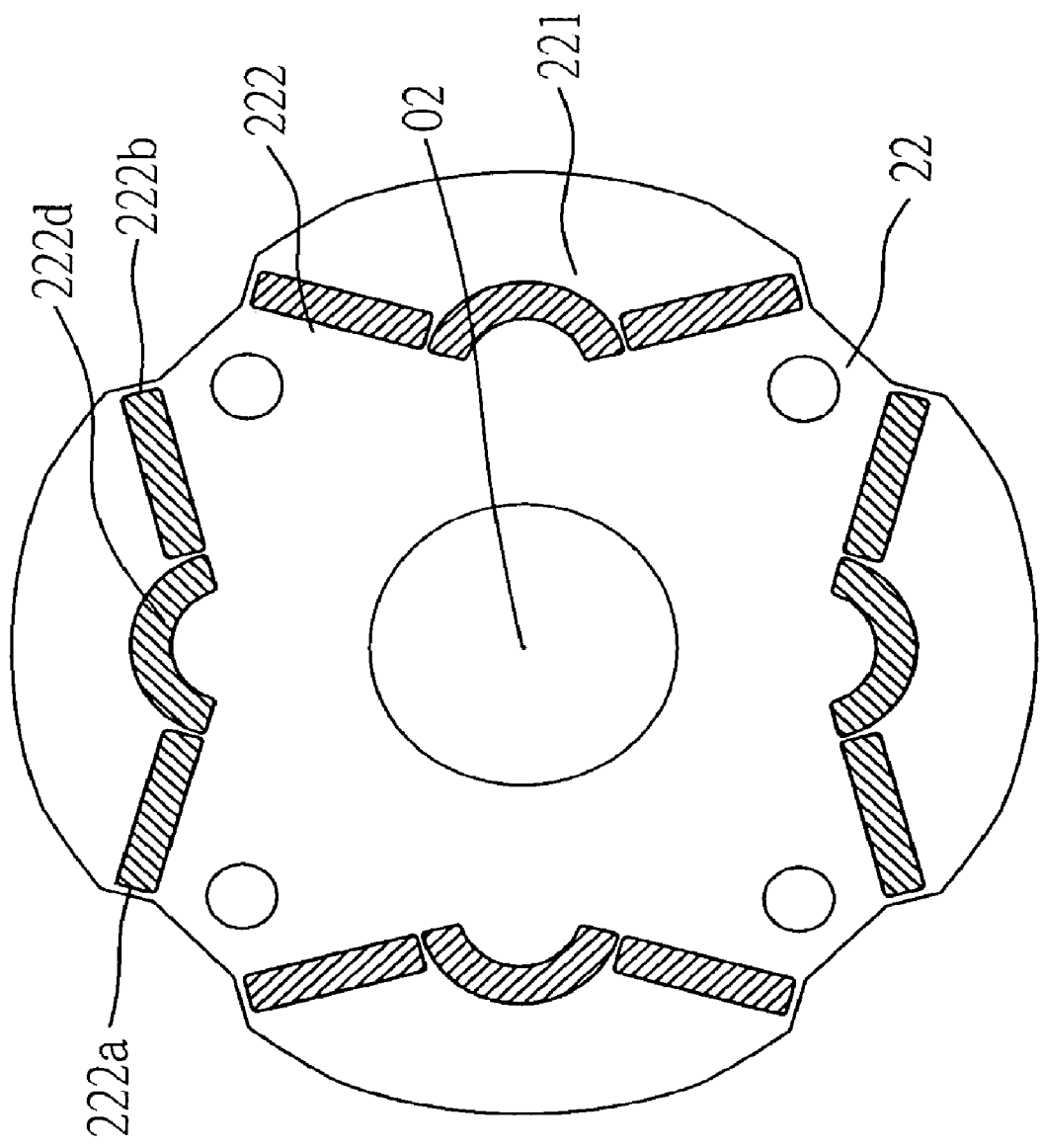
Figure 5E:
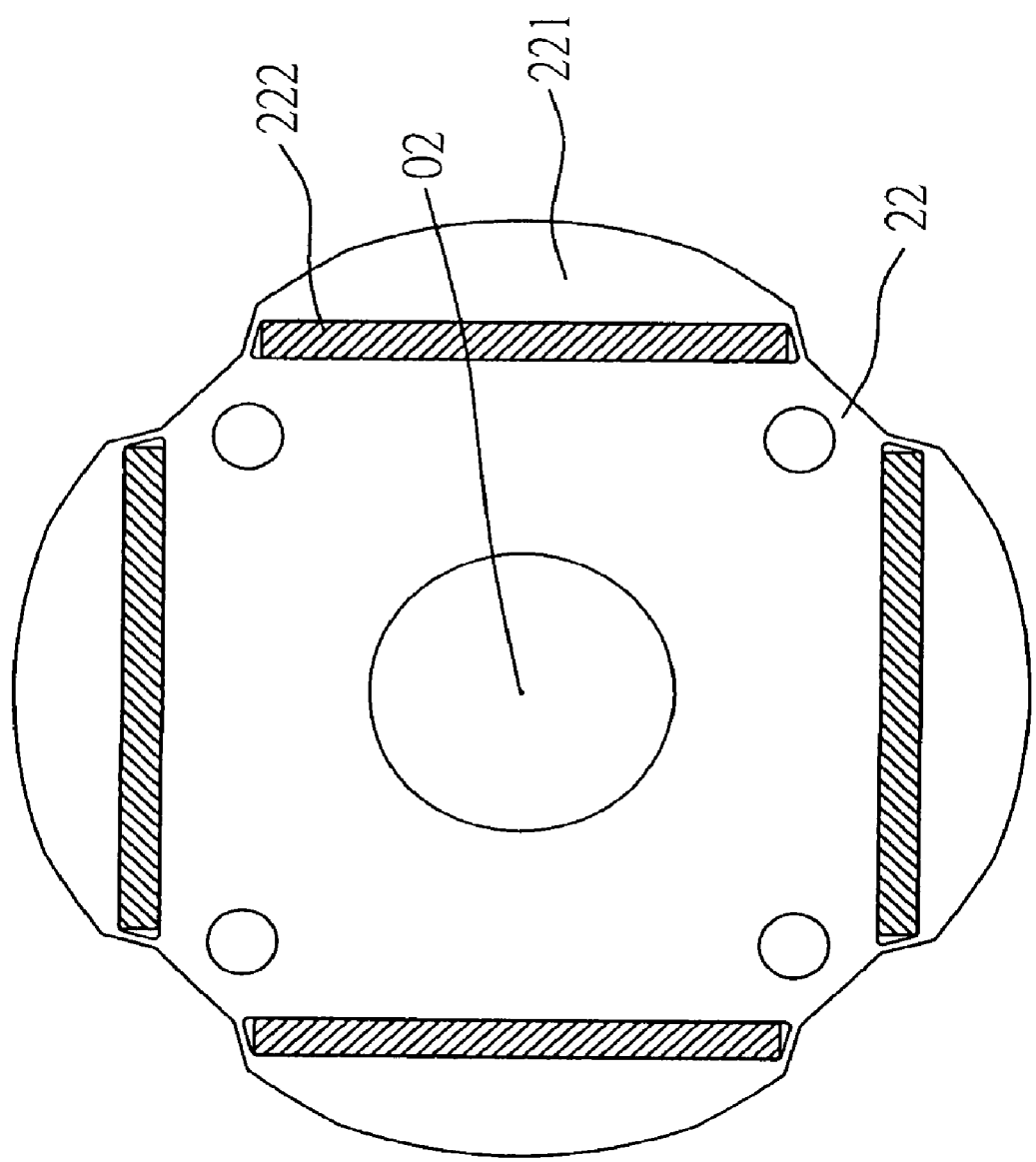

Multiple magnets 222 are respectively disposed in each rotor magnetic pole 221; and both ends 222a and 222b of each magnet 222 are disposed at where close to two second inclined sections 225. A central portion of each magnet 222 approximately indicates a V shape towards a center 02 of the rotor 22. Each magnet may be made in different forms. Wherein, the magnet has it central portion indicating an arc indented inwardly towards the center 02 of the rotor as illustrated in FIG. 5(A); at least one magnet 222 is disposed in each rotor magnetic pole 221 as illustrated in FIG. 5(B); the central portion of each magnet 22 is intended inwardly towards the center 02 of the rotor 22 while the central portion of the magnet 222 indicates a flushed and straight portion 222c with both ends 222a and 222b on both sides outwardly expanded as illustrated in FIG. 5(C); the central portion of each magnet 222 is intended inwardly towards the center 02 of the rotor while the central portion of the magnet 222 is related to a curved portion 222d with the curved portion 222d protruding outwardly towards the center 02 of the rotor 22 and both ends 222a and 222b on both sides outwardly expanded as illustrated in FIG. 5(D); or as illustrated in FIG. 5(E), each magnet is made in strictly flushed and straight form.

The shaft 23 disposed at the center 02 of the rotor 22 is made an integrated part with the rotor 22. Wherein, a slop of the first inclined section 224 is smaller than that of the second inclined section 225 and the second inclined section 225 is in parallel with both ends 22a and 22b of the magnet so that the distance, D1, between each arc surface 223 to the center 02 is identical. Another distance, D2, between each first inclined section 224 and the center 02 of the rotor 22 is on the decrease from the arc surface 223 towards the second inclined section 225. D3, another distance yet between the second inclined section 225 and the center 02 of the rotor 22 is on the decrease from the first inclined section 224 towards the tangent section 226. Accordingly, the distance between each rotor magnetic pole 221 to the center 02 of the rotor 22 is on the decrease from the arc surface (D1) towards the tangent section 226 (D4). An included angle defined by each arc surface 223 to satisfy conditions set forth in an express of $(120/P)° \leq \theta \leq (200/P)°$ when P, the quantity of the rotor magnetic pole is of an even number. In the preferred embodiment, p=4; therefore, $30° \leq \theta \leq 50°$.

Furthermore, multiple air vents 228 are disposed on the rotor 22 and each air vent 228 permits penetration of a riveting hole 229 to reinforce structural strength of the rotor 22; alternatively, when the riveting hole 229 is not provided to maintain the hollow status of each air vent 228, rotation inertia of the rotor is reduced to achieve purpose of heat dissipation.

It is to be noted that the present invention when compared to the prior art provides the following advantages:

1. In the present invention, the distance between each arc surface of the rotor and the center of the rotor is identical to prevent collected flux.

2. The distance from the trap formed between two rotor magnetic poles to the center of the rotor gradually reduces from the arc surface towards the tangent section so to reduce change in flux thus to lower a composition of high harmonic waves contained in a start power wave form for sufficient improvement of the efficiency of the motor.

3. Multiple air vents disposed on the rotor reduce rotation inertia of the rotor for heat dissipation purpose.

4. A riveting hole is inserted through each air vent to reinforce structural strength of the rotor.

The prevent invention provides an improved structure of a permanent magnet motor, and the application for a patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

We claim:

1. A permanent magnet motor comprising
    a stator containing a ring body and multiple stator magnetic poles; each stator magnetic pole protruding from interior of the ring body, and an accommodation room being formed in each stator magnetic pole;
    a rotor related to a plate approximately indicating a circular form and provided in the accommodation room and keeps an air gap from each stator magnetic pole, the rotor being disposed with multiple rotor magnetic poles, and each pole being disposed with a magnet; each rotor magnetic pole being disposed with an arc surface, and a first inclined section and a second inclined section extending in sequence from both sides of the arc surface, a slope of the first inclined section being smaller than that of the second inclined section, a trap being formed between two second inclined section between two abutted rotor magnetic poles connected by a tangent section, both ends of each magnet being disposed at where closer to two second inclined section; and a central portion of each magnet being indented inwardly towards a center of the rotor; and
    a shaft disposed at the center of the rotor and made an integrated part with the rotor.

2. The permanent magnet motor as claimed in claim 1, wherein an included angle, θ, is defined by the arc surface to satisfy conditions set forth in an expression of $(120/P)° \leq \theta \leq (200/P)°$ when the quantity of the rotor magnetic poles is related to an even number.

3. The permanent magnet motor as claimed in claim 1, wherein P, the quantity of the rotor magnetic poles is related to an even number.

4. The permanent magnet motor as claimed in claim 1, wherein the second inclined section is in parallel with the end of the magnet.

5. The permanent magnet motor as claimed in claim 1, wherein multiple air vents are disposed on the rotor.

6. The permanent magnet motor as claimed in claim 5, wherein each air vent is inserted with a riveting hole.

7. The permanent magnet motor as claimed in claim 1, wherein at least one magnet is disposed in each rotor magnetic pole.

8. The permanent magnet motor as claimed in claim 1, wherein the central portion of each magnet is indented inwardly to approximately indicate a V shape towards the center of the rotor.

9. The permanent magnet motor as claimed in claim 8, wherein at least one magnet is disposed in each rotor magnetic pole.

10. The permanent magnet motor as claimed in claim 1, wherein the central portion of each magnet is indented to indicate an arc form towards the center of the rotor.

11. The permanent magnet motor as claimed in claim 10, wherein at least one magnet is disposed in each rotor magnetic pole.

12. The permanent magnet motor as claimed in claim 4, wherein the central portion of each magnet is indented inwardly towards the center of the rotor; the central portion of the magnet is related to a flushed and straight portion; and two ends on both sides are outwardly expanded.

13. The permanent magnet motor as claimed in claim 4, wherein the central portion of each magnet is indented inwardly towards the center of the rotor; the central portion of the magnet is related to a curved portion; the curved portion protrudes outwardly towards the center of the rotor; and two ends on both sides are outwardly expanded.

14. The permanent magnet motor as claimed in claim 1, wherein each magnet indicates a flushed and straight form.

* * * * *